June 7, 1932.  V. E. SCHMIEDEKNECHT  1,862,436
CONTINUOUS MIXING MACHINE
Filed April 15, 1931   5 Sheets-Sheet 1
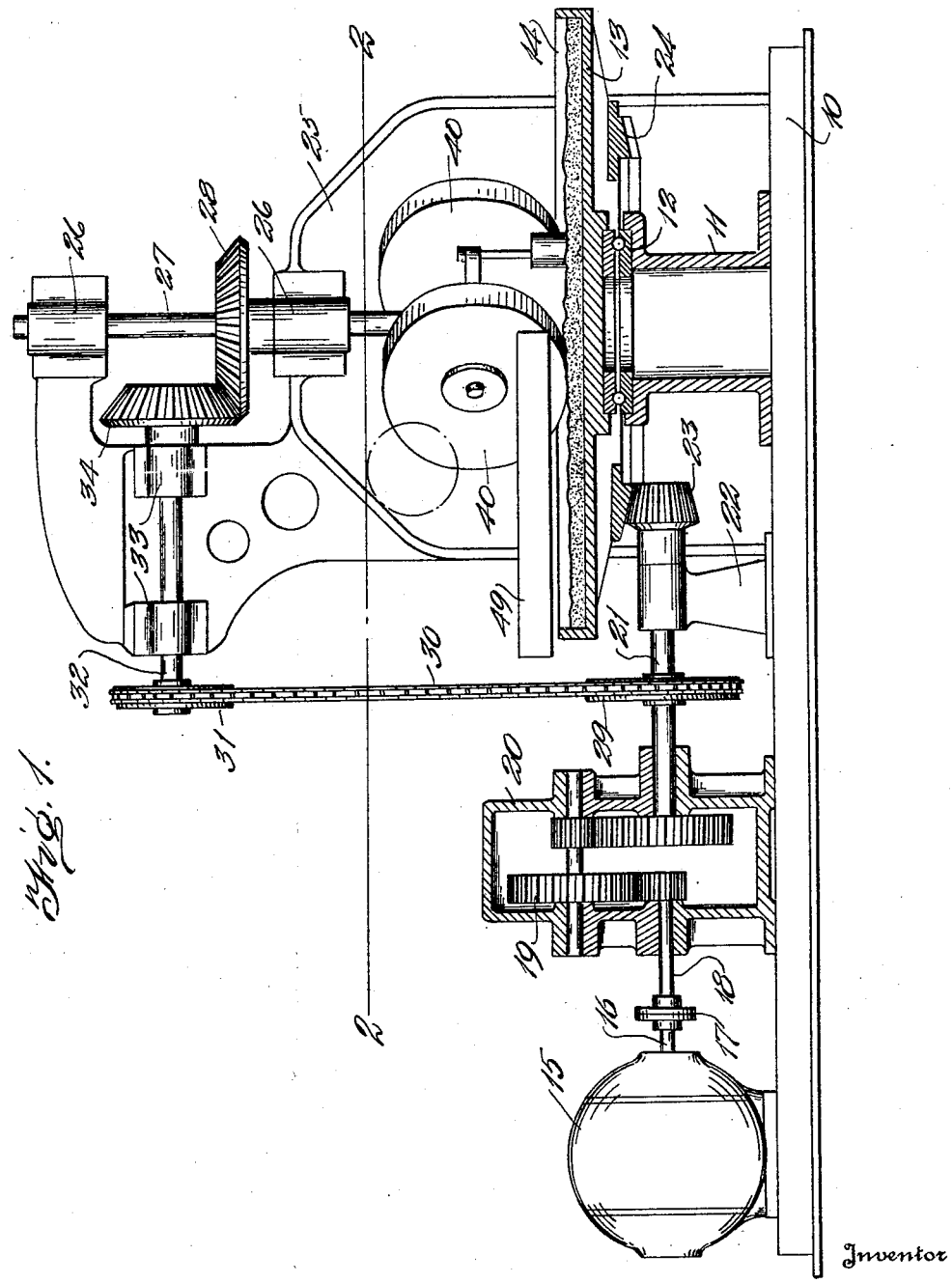

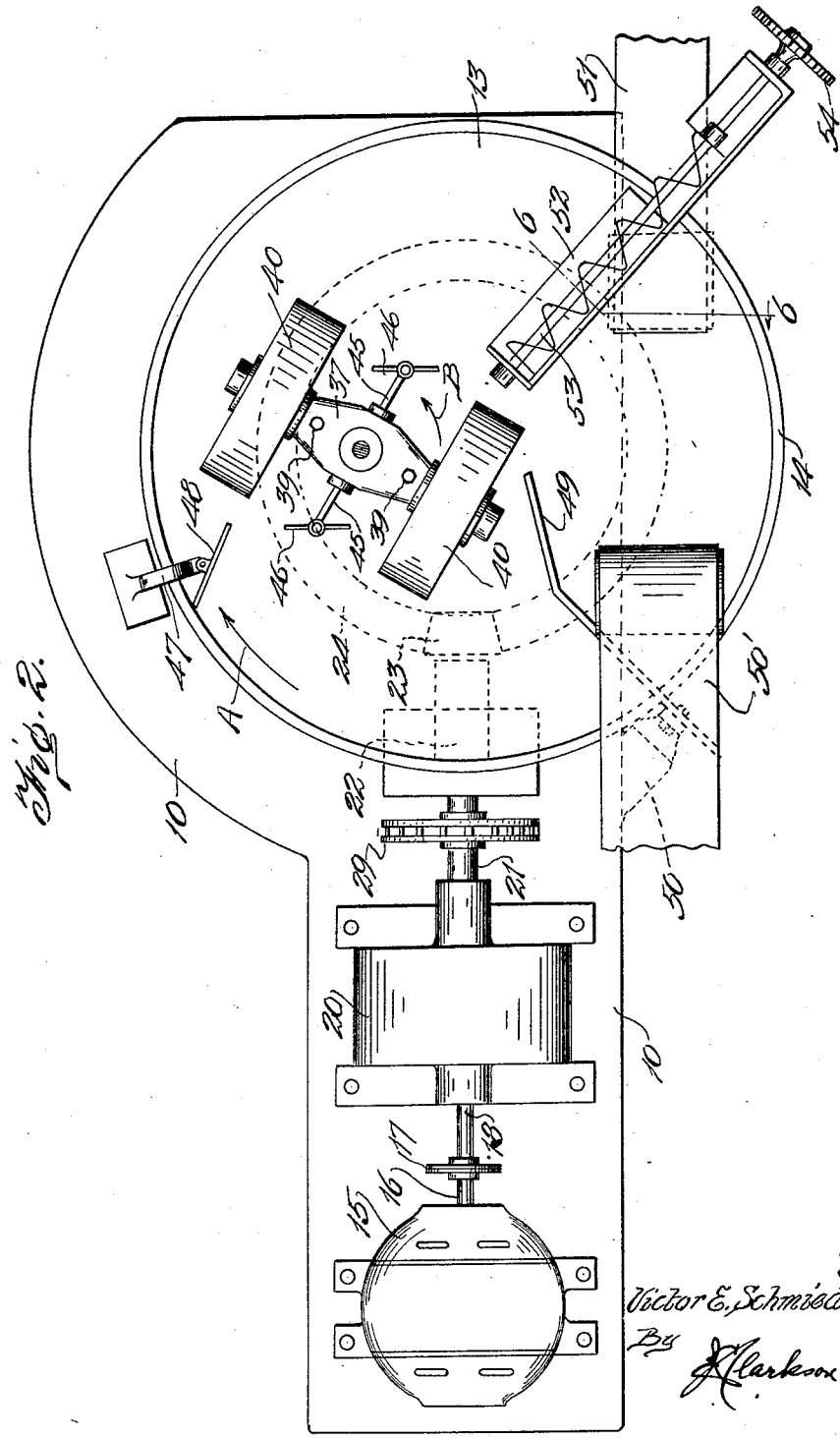

June 7, 1932.  V. E. SCHMIEDEKNECHT  1,862,436
CONTINUOUS MIXING MACHINE
Filed April 15, 1931  5 Sheets-Sheet 3
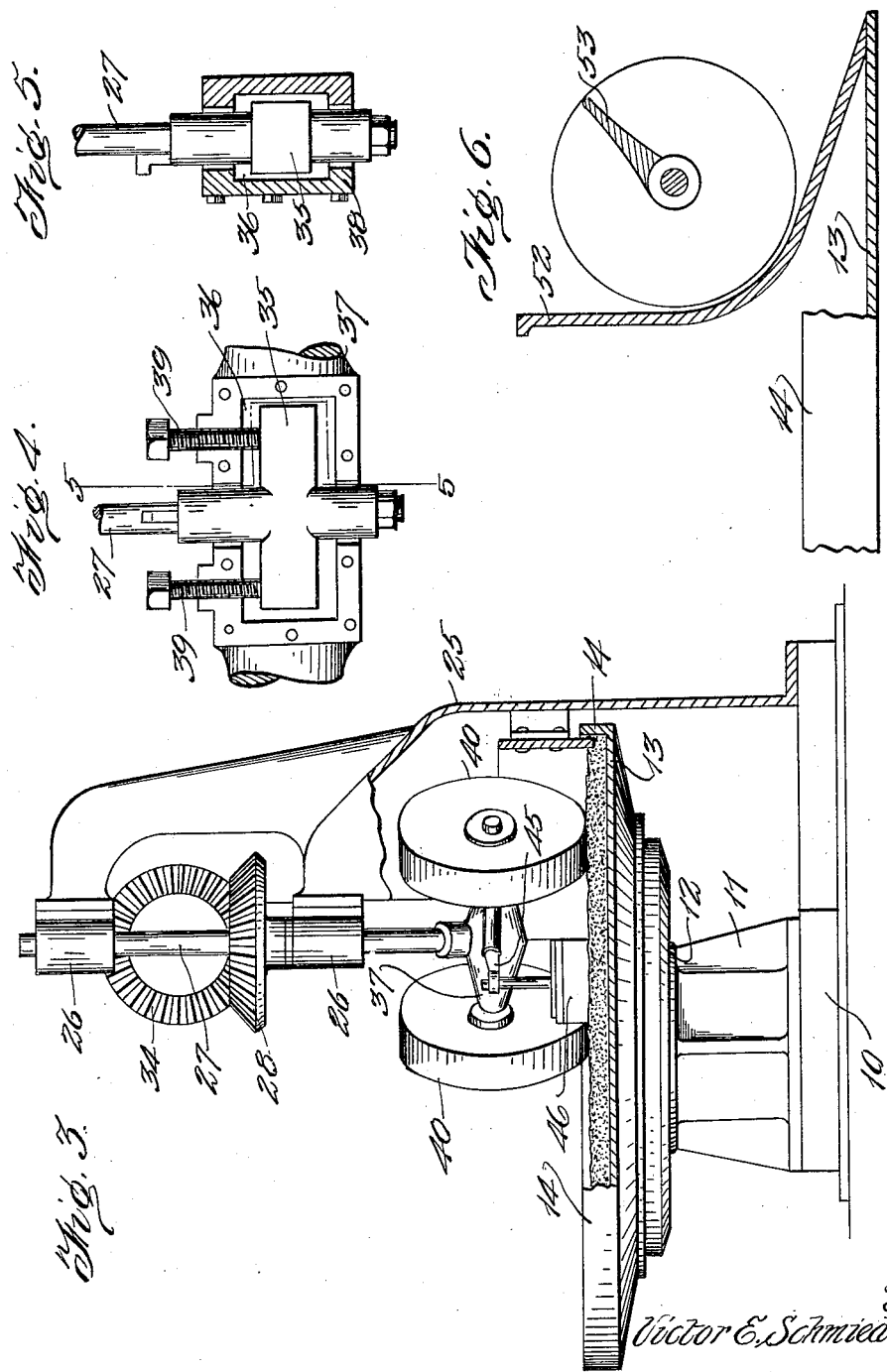
Inventor
Victor E. Schmiedeknecht
By
Clarkson
Attorney

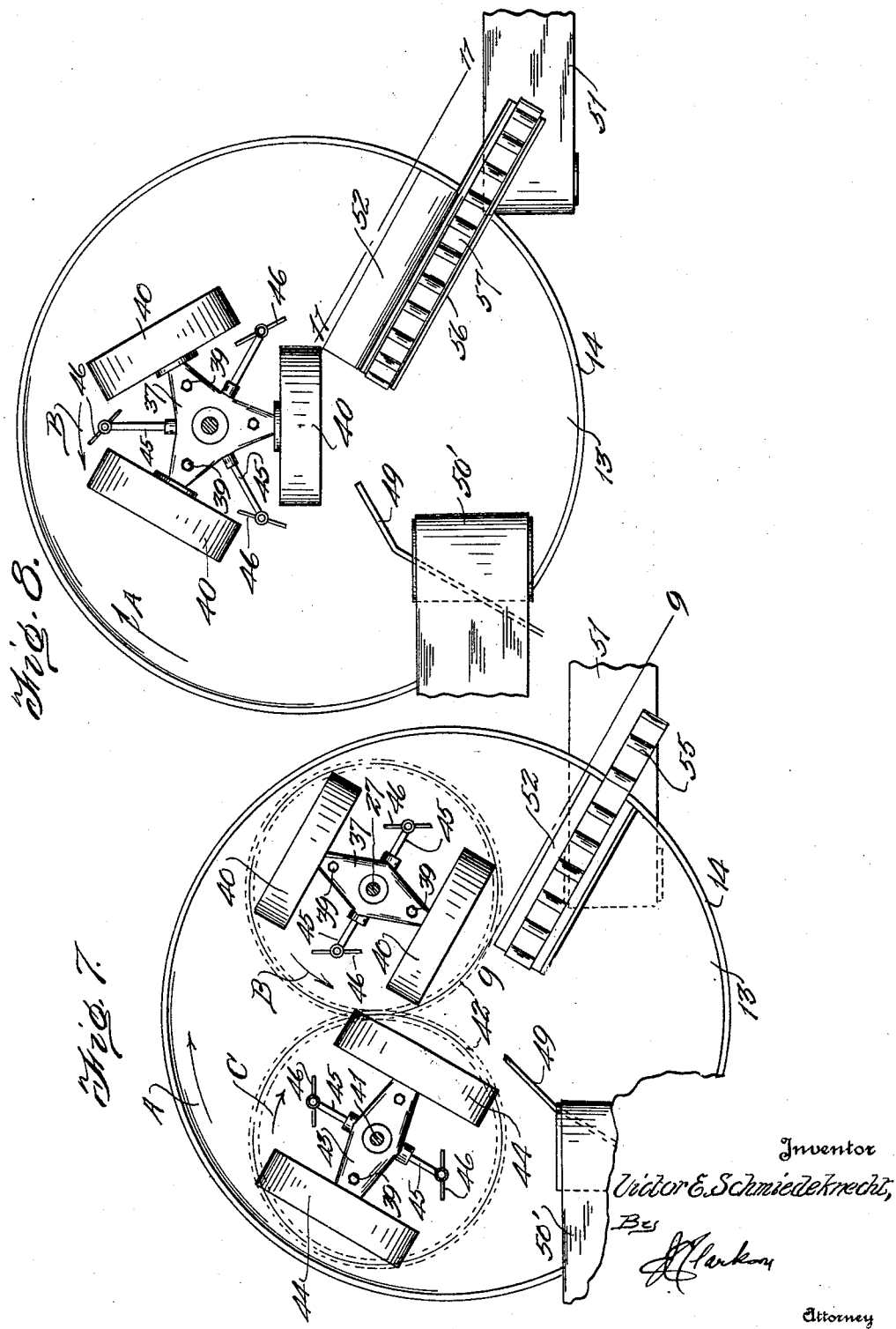

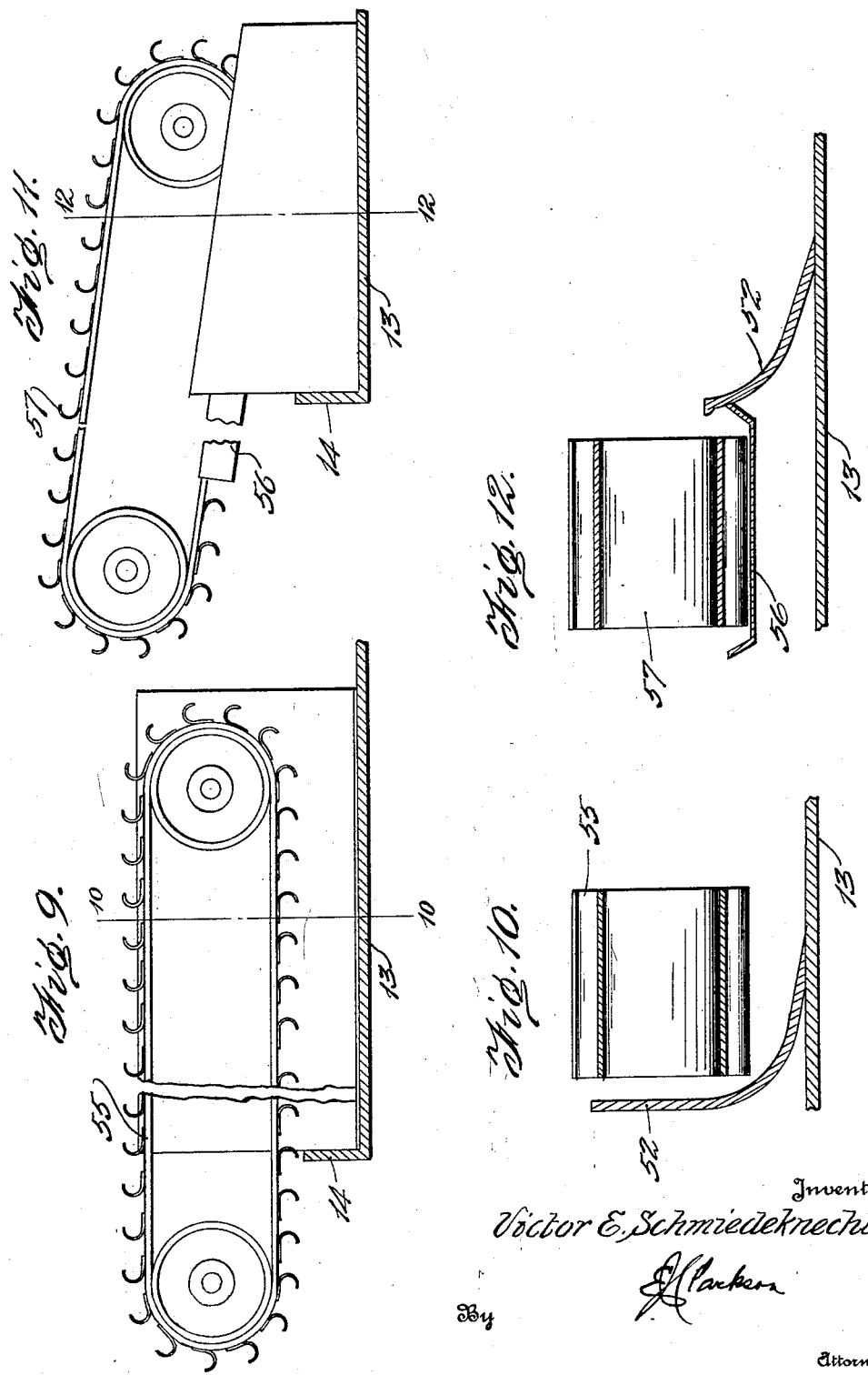

Patented June 7, 1932

1,862,436

UNITED STATES PATENT OFFICE

VICTOR E. SCHMIEDEKNECHT, OF LOUISVILLE, KENTUCKY

CONTINUOUS MIXING MACHINE

Application filed April 15, 1931. Serial No. 530,398.

This invention relates to mixing or blending and tempering devices and has special reference to a muller for pulverulent material.

More particularly the invention relates to a constantly operating muller adapted for use in the continuous mulling of a constantly flowing stream of pulverulent material and the device may be used for the mulling of any desired material such as chemical and medicinal mixtures, blends of fertilizers, pigments and other materials, the device being especially of value in the mulling of molding sand to enable it to be reused a number of times and to obtain uniform blends of used or spent sand and fresh sand.

It has been quite common, in mulling machines, to provide a machine into which a batch of the material to be mulled could be placed after which the machine is operated until the batch is thoroughly mulled whereupon the machine is stopped and the completed batch removed. This method is that which must be used with the machines now commonly in use and is open to numerous objections. In the first place the treatment by separate batches is necessarily intermittent and either prevents continuous operation of other machines employed in connection with sand molding and metal founding or requires the establishment of considerable storage facilities at different places in the line of operations for such molding and casting. Secondly, the treatment by batches makes necessary a machine having sufficient capacity to receive at once all the sand which accumulates from the time one batch is loaded into the machine until the machine has been emptied of that batch and is ready to receive the next unless the other operations usually associated with sand molding and casting are to be interrupted. Of course, two or more smaller machines might be used in place of one large one but in any event the mulling capacity must be at least large enough to accommodate all the sand used for molding and when several machines are used the conveyor systems which have to be used in continuous molding and casting become complicated and undesirable mechanically.

Associated with the mulling of these large batches is the fact that for practical purposes the diameter of the mulling machines is strictly limited so that the batch must lie on the mulling pan or floor in a very thick layer which makes proper and complete blending of the batch so slow of accomplishment that much more time is occupied than is the case where the same quantity of material is mulled in a thin layer.

Because of these and other objectionable features inherent in all machines requiring batch operations the present invention has for one principal object the provision of a novel and improved mulling machine especially adapted to have material fed constantly into the machine at one point and as continuously removed after complete mulling.

A second important object of the invention is to provide a machine of this character wherein, by reason of its continuous operation, a machine of small size will produce as much completely mulled material as is commonly produced by a large machine or several machines operating on batches of material.

A third important object of the invention is the provision of a machine wherein the material will be mulled in a thin layer so that the mulling operation is performed in a rapid and thorough manner.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is a side view partly in section of one form of the machine.

Fig. 2 is a section on the line 2—2 of Fig. 1 with certain parts omitted.

Fig. 3 is a view similar to Fig. 1 but taken at right angles thereto.

Fig. 4 is a detail view showing the method of attaching the muller wheels to their driving shaft.

Fig. 5 is a section on the line 5—5 of Fig. 4.

Fig. 6 is an enlarged detail section on the line 6—6 of Fig. 2.

Fig. 7 is a view in horizontal section similar to Fig. 2 but showing only a modification of the mulling wheel arrangement and the means for removing the mulled material from the pan.

Fig. 8 is a view similar to Fig. 7 but showing a second modification of the mulling wheels and material removing means.

Fig. 9 is an enlarged detail section on the line 9—9 of Fig. 7.

Fig. 10 is a section on the line 10—10 of Fig. 9.

Fig. 11 is an enlarged detail section on the line 11—11 of Fig. 8.

Fig. 12 is a section on the line 12—12 of Fig. 11.

In the construction of the machine as here disclosed there is provided a base 10 and adjacent one end of this base there is provided a standard or post 11 whereon is mounted the lower race of a ball bearing 12. A muller pan 13 having a peripheral wall 14 is mounted on the upper race of the bearing 12 so that this pan is freely revoluble on its vertical axis. Mounted on the opposite end of the base is a motor 15 having its shaft 16 connected by a coupling 17 with the driving shaft 18 of a gear train 19 mounted in a casing 20 supported on the base 10. This gear train is arranged to form a speed reducing gear and is provided with a driven shaft 21 supported in a bearing 22 mounted on the base 10. On the end of this shaft, which projects beneath the pan or rotary floor 13, is fixed a bevel pinion 23 which meshes with a bevel ring gear 24, mounted on the under side of the pan 13 so that operation of the motor drives the pan in the direction of the arrow A of Figs. 2, 7 and 8.

Extending upwardly from the base 10 is a housing or standard 25 which partly surrounds and overhangs the pan and is provided with a pair of vertically aligned bearings 26 wherein is journalled a muller wheel driving shaft 27 and on this shaft is fixed a bevel gear 28. On the shaft 21 is fixed a sprocket wheel 29 which is connected by a chain 30 with a sprocket wheel 31 fixed on a shaft 32 mounted in horizontally disposed aligned bearings 33. A bevel bear 34 is fixed on the shaft 32 and meshes with the gear 28 so that the muller driving shaft 27 is driven in the direction of the arrow B in Figs. 2, 7 and 8 or opposite the direction of movement of the pan 13. On the lower end of the shaft 27 is fixed a cross-head 35 which is held in a socket or chamber 36 formed centrally of a muller wheel spider 37 which may have two arms as shown in Figs. 2 and 3 or more than two arms as indicated by the three armed spider of Fig. 8. This spider is slidably mounted on the vertical arms of the cross-head, the vertical dimension of the socket 36 being such as to permit such movement. The cross-head is held in the socket by a cover plate 38 suitably bolted to the spider, this construction being used to permit separation of the spider from the driving shaft. Set screws 39 pass through the top of the socket and limit downward movement of the spider relative to the shaft 27 and by their adjustment permit variation in the limits of movement of the spider. On the ends of the spider arms are mounted muller wheels 40 which, by the adjustment of the screws 39 are held in such spaced relation to the bottom of the pan as may be desired or found suitable for the material to be treated.

In the modification shown in Fig. 7 a second shaft 41 is connected to the shaft 27 by gears 42 and carries a spider 43 supporting the muller wheels 44 which revolve in the direction of the arrow C.

Each of the spiders carries radial arms 45 supporting scrapers 46 positioned to scrape material outwardly from beneath the center of the spiders so as to ensure the working of all of the material. Also the base is provided with a goose neck standard 47 which overhangs the pan and carries a scraper 48 which deflects material in the pan inwardly from the periphery of the pan into the paths of the muller wheels and it is to be noted that these wheels are arranged to revolve in the paths eccentric to the axis of the pan and as close to the wall of the pan as can conveniently be arranged.

Overhanging the pan to the left of what may be termed its front part is a delivery conveyor 50' driven by suitable means (not shown) and arranged to deliver material constantly to the revolving pan, the delivered material being evened off in a thin layer by an evener blade 49 supported at a suitable height above the bottom of the pan by a standard 50 carried by the base 10. Extending from beneath the right or delivery side of the pan is a delivery conveyor 51 which is also suitably driven by means not shown to constantly operate.

In the form of the delivery mechanism shown in Fig. 2 and detailed in Fig. 6 there is provided within the pan a fixed and transversely curved scraper 52 extending about radially of the pan, the inner end being somewhat angularly advanced with respect to a radial line passing through its outer end. The front edge of this scraper is sharp and engages the bottom of the pan, the scraper inclining upwardly and rearwardly from this edge and terminating in a rear wall extending above the pan wall. This scraper thus forms a half trough wherein is housed a spiral conveyor 53 which extends out over the pan wall and is driven by a sprocket 54 from suitable means (not shown). The half trough terminates outwardly over the delivery conveyor 51 so that material moved out by the conveyor 53 will be delivered to the conveyor 51.

In the form shown in Figs. 7, 9 and 10 the spiral conveyor is replaced by a belt and flight conveyor the inner and lower side of which runs in the half trough, the lower side moving outwardly to draw the material collected by the half trough outwardly to drop on the conveyor.

In the form shown in Figs. 8, 11 and 12 an inclined trough 56 is located just behind the half trough to receive the material collected and flowing over its rear wall and a belt conveyor 57 similar to the conveyor 55 operates in this trough to move the material outwardly in the trough and thus deliver it to the delivery conveyor 51.

In the use of each of these forms the pan, muller wheels and conveyors operate constantly so that the material is delivered in a constant stream from the conveyor 50' to the pan where it moves with the pan in the direction of the arrow A. As the material is carried around it is leveled off in a thin layer by the levelling blade 49 and passes beneath the muller wheels 40 where it is thoroughly mulled. Any material close to the edge of the pan is deflected inwardly by the scraper 48 while any material that tends to work in to the outer of the space between the muller wheels is deflected outwardly by the scrapers carried by the spider. After leaving the mulling wheels the material is carried around to the half trough or gathering scraper 51 where it mounds up and is carried out over the edge or wall of the pan by the transfer conveyor and delivered to the delivery conveyor 51.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed, as new, is:

1. In a mulling machine, a vertical muller wheel shaft, a sleeve keyed on the lower end of the shaft and having oppositely extending arms forming a cross-head, a head having a central chamber surrounding the cross-head and spaced therefrom, said chamber having vertically aligned openings for the end portions of said sleeve, adjusting screws screwed through the upper part of the head and entering the chamber to engage on top of said arms, and muller wheels carried by said head.

2. In a mulling machine, a revolving pan, a scraper extending radially of said pan with an edge in contact therewith, said scraper being inclined upwardly away from the direction of movement of the engaged portion of the pan to elevate the material in said pan, and a conveyor positioned alongside the scraper to receive material gathered by the scraper and arranged to move the elevated material outwardly over the edge of the pan.

3. In a mulling machine, a revolving pan, a scraper extending radially of said pan with an edge in contact therewith, said scraper being inclined upwardly away from the direction of movement of the engaged portion of the pan to elevate the material in said pan, said scraper having a vertical rear wall curved forwardly at its lower part to merge into the inclined portion at its upper and rear edge, and a rotary screw conveyor positioned along the curved portion of the scraper and arranged to feed material outwardly along the scraper.

4. In a mulling machine, a revolving pan, a scraper extending radially of said pan with an edge in contact therewith, said scraper being inclined upwardly away from the direction of movement of the engaged portion of the pan to elevate the material in said pan, and a conveyor extending behind the scraper and below the rear edge of the scraper to receive material gathered by the scraper and flowing over said edge onto the conveyor, said conveyor projecting over the rim of said pan.

In testimony whereof I affix my signature.

VICTOR E. SCHMIEDEKNECHT.